US006954822B2

(12) United States Patent
Bains et al.

(10) Patent No.: US 6,954,822 B2
(45) Date of Patent: Oct. 11, 2005

(54) TECHNIQUES TO MAP CACHE DATA TO MEMORY ARRAYS

(75) Inventors: Kuljit S. Bains, Olympia, WA (US); Herbert Hum, Portland, OR (US); John Halbert, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 389 days.

(21) Appl. No.: 10/211,680

(22) Filed: Aug. 2, 2002

(65) Prior Publication Data

US 2004/0024952 A1 Feb. 5, 2004

(51) Int. Cl.[7] ................................................ G06F 12/00

(52) U.S. Cl. ............................... 711/5; 711/3; 711/128; 365/230.02; 365/230.03; 365/239

(58) Field of Search ................................. 711/3, 5, 128, 711/118, 129; 365/230.02, 230.03, 239

(56) References Cited

U.S. PATENT DOCUMENTS

| | | | |
|---|---|---|---|
| 5,577,223 A | 11/1996 | Tanoi et al. | |
| 5,895,487 A | 4/1999 | Boyd et al. | |
| 5,953,739 A | 9/1999 | Zagar et al. | |
| 6,044,433 A | 3/2000 | Zagar et al. | |
| 6,081,853 A * | 6/2000 | Gaskins et al. | 710/35 |
| 6,192,459 B1 * | 2/2001 | Bonella et al. | 711/220 |
| 6,275,901 B1 * | 8/2001 | Zager et al. | 711/128 |
| 6,681,294 B1 * | 1/2004 | Kato et al. | 711/128 |
| 6,687,790 B2 * | 2/2004 | Zager et al. | 711/128 |
| 2001/0034808 A1 * | 10/2001 | Nakajima et al. | 711/3 |

OTHER PUBLICATIONS

Tendler, Joel M., et al., "IBM @server POWER4 System Microarchitecture," a Technical White Paper, Oct. 2001, 33 pages.

Johnson, David J.C., "HP's Mako Processor," Hewlett–Packard Company, Oct. 16, 2001, 16 pages.

* cited by examiner

*Primary Examiner*—Mano Padmanabhan
*Assistant Examiner*—Jasmine Song
(74) *Attorney, Agent, or Firm*—Erik M. Metzger

(57) ABSTRACT

Methods and apparatuses for mapping cache contents to memory arrays. In one embodiment, an apparatus includes a processor portion and a cache controller that maps the cache ways to memory banks. In one embodiment, each bank includes data from one cache way. In another embodiment, each bank includes data from each way. In another embodiment, memory array banks contain data corresponding to sequential cache lines.

24 Claims, 8 Drawing Sheets

TECHNIQUES TO MAP CACHE DATA TO MEMORY ARRAYS

RELATED APPLICATION

This application is related to application Ser. No. 10/210, 908 entitled "A High Speed DRAM Cache Architecture", filed concurrently and assigned to the assignee of the present application.

BACKGROUND

1. Field

The present disclosure pertains to the field of cache memories. More particularly, the present disclosure pertains to a new cache architecture using a dynamic random access memory (DRAM) or the like and methods of mapping cache entries into the memory.

2. Description of Related Art

Cache memories generally improve memory access speeds in computer or other electronic systems, thereby typically improving overall system performance. Increasing either or both of cache size and speed tend to improve system performance, making larger and faster caches generally desirable. However, cache memory is often expensive, and generally costs rise as cache speed and size increase. Therefore, cache memory use typically needs to be balanced with overall system cost.

Traditional cache memories utilize static random access memory (SRAM), a technology which utilizes multi-transistor memory cells. In a traditional configuration of an SRAM cache, a pair of word lines typically activates a subset of the memory cells in the array, which drives the content of these memory cells onto bit lines. The outputs are detected by sense amplifiers. A tag lookup is also performed with a subset of the address bits. If a tag match is found, a way is selected by a way multiplexer (mux) based on the information contained in the tag array.

A DRAM cell is typically much smaller than an SRAM cell, allowing denser arrays of memory and generally having a lower cost per unit. Thus, the use of DRAM memory in a cache may advantageously reduce per bit cache costs. One prior art DRAM cache performs a full hit/miss determination (tag lookup) prior to addressing the memory array. In this DRAM cache, addresses received from a central processing unit (CPU) are looked up in the tag cells. If a hit occurs, a full address is assembled and dispatched to an address queue, and subsequently the entire address is dispatched to the DRAM simultaneously with the assertion of load address signal.

BRIEF DESCRIPTION OF THE FIGURES

The present invention is illustrated by way of example and not limitation in the Figures of the accompanying drawings.

DETAILED DESCRIPTION

The following description provides techniques to map cache data to memory arrays. In the following description, numerous specific details are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

Various embodiments disclosed may allow a high density memory such as a DRAM memory to be efficiently used as cache memory. Some embodiments provide particular cache way and/or bank mapping techniques that may be advantageous in particular situations. Some embodiments effectively pipeline tag lookups with memory access cycles to reduce memory access latency. These and other embodiments may be used in a variety of high speed cache architectures applicable to a wide variety of applications.

The term DRAM is used loosely in this disclosure as many modem variants of the traditional DRAM memory are now available. The techniques disclosed and hence the scope of this disclosure and claims are not strictly limited to any specific type of memory, although single transistor, dynamic capacitive memory cells may be used in some embodiments to provide a high density memory array. Various memories arrays which allow piece-wise specification of the ultimate address may benefit from certain disclosed embodiments, regardless of the exact composition of the memory cells, the sense amplifiers, any output latches, and the particular output multiplexers used.

Figure 1:
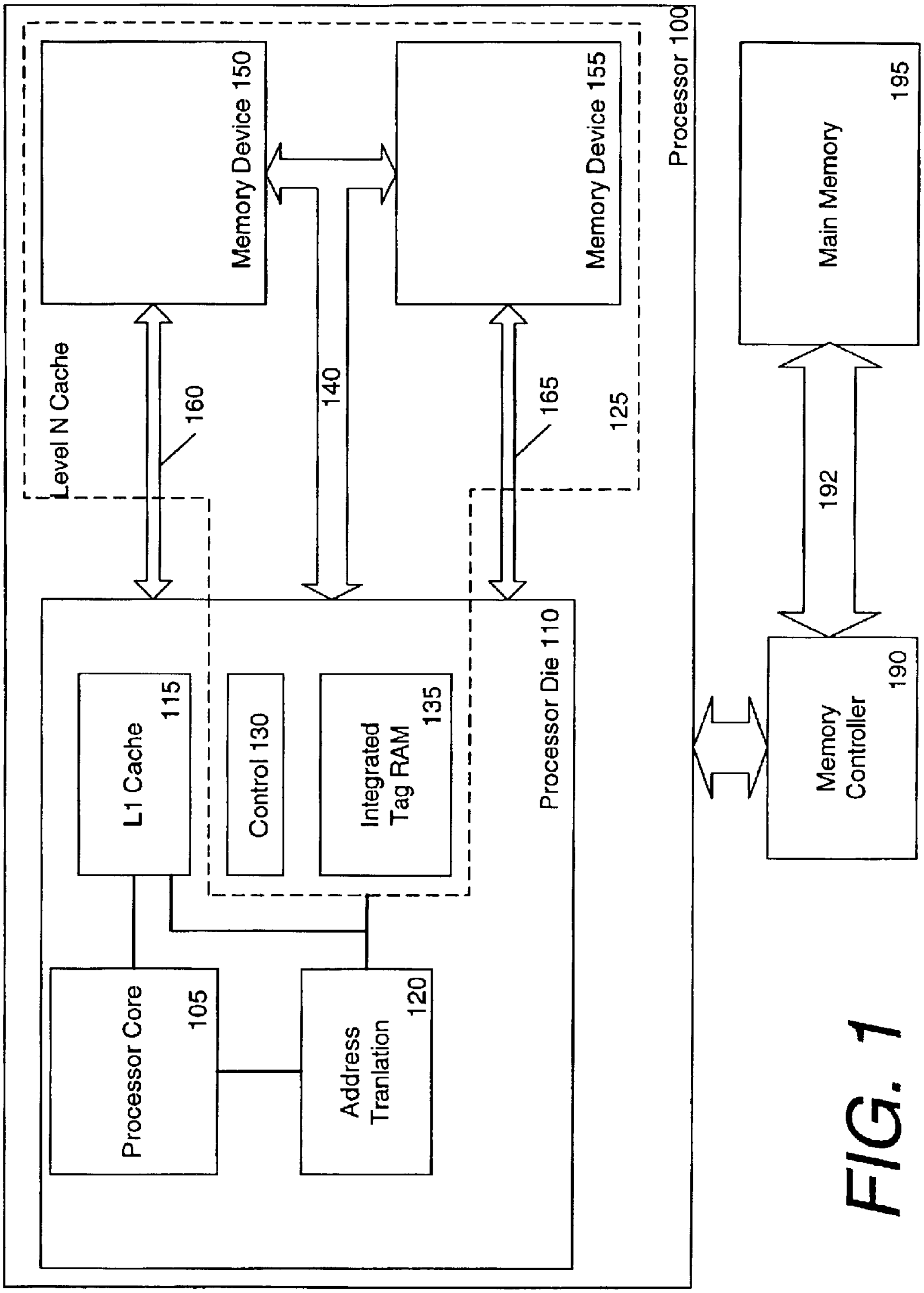
FIG. 1 illustrates one embodiment of a system having a processor utilizing a DRAM cache.

FIG. 1 illustrates a system including one embodiment of a processor 100 utilizing a DRAM cache. The processor 100 may be any of a wide variety of types of processors. For example, the processor 100 may be a general purpose processor usable for a variety of applications including computers such as desktop, laptop, server, embedded, etc., computers. The processor 100 may also be a special purpose processor such as a network processor, a communications processor, a graphics processor, a digital signal processor, or any other type of special purpose processor that may benefit from cache memory.

In the embodiment of FIG. 1, the processor 100 includes a processor die 110 as well as memory devices 150 and 155, and buses to connect to these memory devices to the processor die 110. In the embodiment of FIG. 1, a data bus 160 and a command and address bus 140 couple the memory device 150 to the processor die 110. Similarly, a data bus 165 and the command and address bus 140 couple the memory device 155 to the processor die 110. Additionally, the processor die 110 includes a cache control circuit 130 and an integrated tag RAM 135. Together, the cache control circuit 130, the integrated tag RAM 135, the two memory devices 150 and 155, and the interconnecting buses form a level-N cache memory 125. In other embodiments, more or fewer memory devices may be used. Additionally, separate memory devices may have their own address and command buses, and these buses may or may not be multiplexed in various embodiments.

In the embodiment of FIG. 1, the processor die 110 also includes a level one cache 115, a core 105, and address translation logic 120. The core 105 represents any execution core that is capable of executing instructions, including instructions that generate accesses to memory. In response to an instruction that generates an access to memory, the core 105 outputs a memory request including an address to the address translation logic 120. The address translation logic 120 may perform conventional paging, segmentation, and/or other known or otherwise available address translation functions. Additionally, the request is communicated to the level one cache 115. The level one cache 115 may work on translated or untranslated addresses in different embodiments. In some embodiments, testing whether a cache hit occurs in the level one cache 115 may be a precondition to forwarding the memory request to the next level of cache. In other embodiments, accesses to multiple levels of cache may be initiated prior to hit or miss determinations in the lower-level caches.

In either case, the memory request is forwarded to the level-N cache 125 at some point if a miss in the lower level cache occurs. The memory request may be forwarded to the level-N cache and then aborted in some embodiments upon a lower level cache hit. Assuming that a cache lookup is to be performed in the level-N cache 125, the cache control circuit 130 receives the translated address from the address translation logic 120 and initiates transmission of that address to the memory devices. If the command and address bus 140 is immediately available, a portion of the address from the request may be driven on the command and address bus 140. However, the cache control circuit 130 may be forced to queue the request if the command and address bus 140 is in use. In either case, the cache control circuit 130 initiates a transfer of a first portion of the translated address by dispatching the first portion of the translated address received from the address translation logic 120 (either to the bus or to a queue). In this embodiment, at the point when the transfer of the first address portion is initiated, the remainder of the address is unknown because the tag lookup has not been completed. In fact, it may not yet be known whether the requested memory location is cached in the cache 125 because the tag lookup typically also indicates whether a hit or miss occurred.

The cache control circuit 130 also initiates the tag lookup according to the address received from the address translation logic 120. Thus, the way information from the integrated tag RAM 135 is not available until subsequent to at least initiating the transfer of the first address portion to the memory device in this embodiment. The way information is driven on a subsequent cycle on the command and address bus 140. Thus, the tag lookup latency may be advantageously masked by first transmitting the row information and then transmitting the column information which indicates the results of the tag lookup.

The bus 140 in the embodiment of FIG. 1 may be a multiplexed bus in that multiple cycles may be used to transmit a full address as needed to uniquely request a particular size entry from the memory array. For example, a row address portion and a command may first be transmitted over the bus, and then a column address may be transmitted over at least some of the same bits of the bus in order to select a cache line or other unit of data. More, less, or different multiplexing arrangements may be used; however, the multiplexed address and command bus generally transmits at least some bits of a full address (e.g., row bits) in serial fashion with respect to other bits of the full address (e.g., column bits). In some embodiments, commands have separate commands lines and commands may or not be multiplexed. In some embodiments, commands may be multiplexed with the address or address portions. Also, as previously mentioned, some embodiments may not use a multiplexed bus at all.

The system shown in FIG. 1 includes a memory controller 190 coupling the processor 100 to a main memory 195 via a memory bus 192. The main memory may store memory locations that are also held in the various level of caches as well as memory locations that have not yet been cached in any of the various cache levels. Therefore, the main memory 195 is typically accessed in response to a miss in the Level-N cache, which is in this embodiment the highest level of cache closely coupled to and/or included as a part of the processor. The particular type of memory or storage technology used for main memory may vary, and the main memory may also include various levels of hierarchical store (e.g., DRAM memory, disk, etc.).

Figure 2:
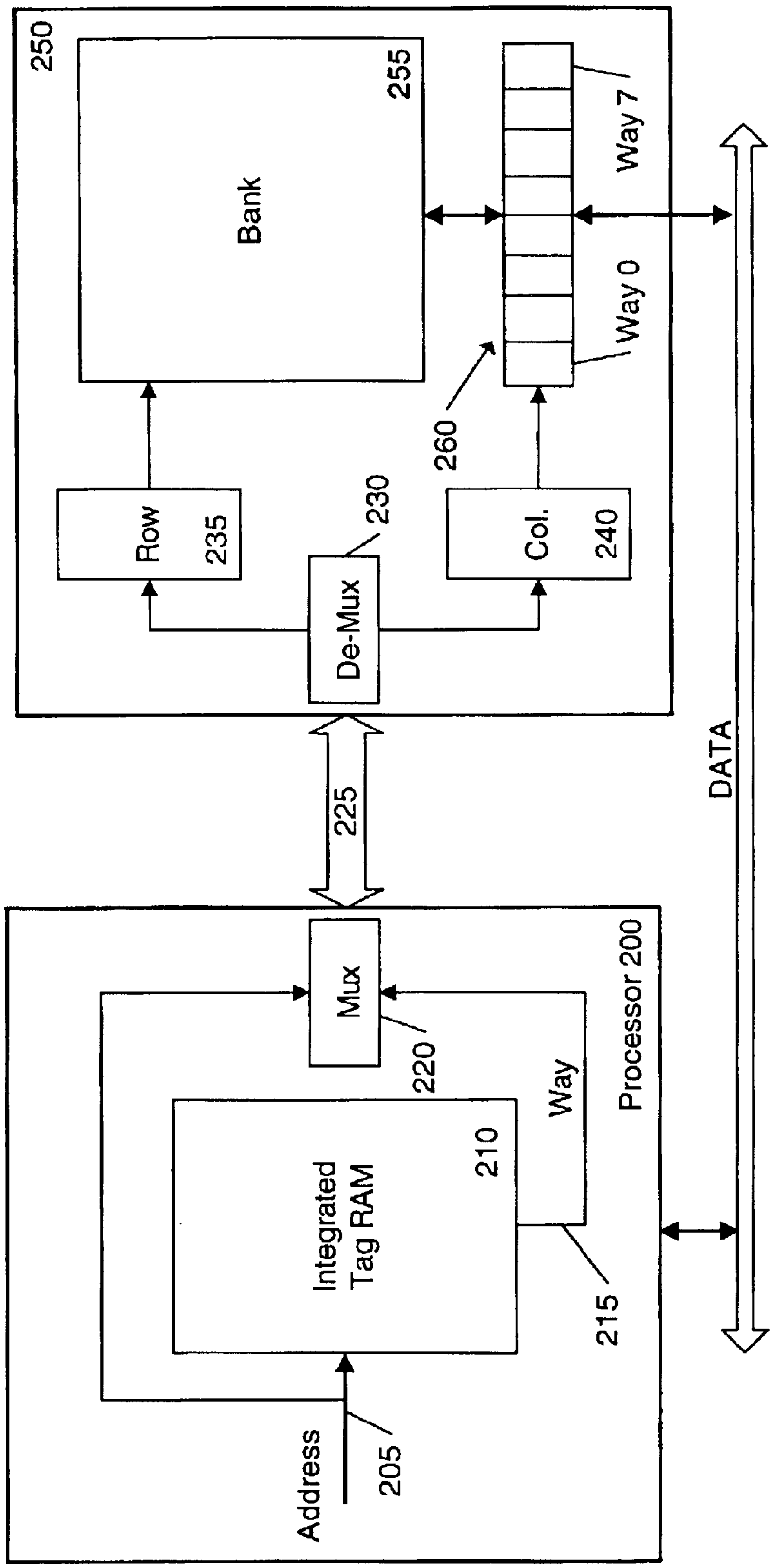
FIG. 2 illustrates one embodiment of a cache arrangement having one bank.

FIG. 2 illustrates additional details of how cache ways of a set associative cache may be mapped to a DRAM device having one bank and eight cache ways. In the embodiment of FIG. 2, a processor 200 includes an eight way tag RAM 210. An address 205 is multiplexed by a multiplexer 220 onto a multiplexed address bus 225. Additionally, the address 205 is looked up in the tag RAM 210. If a hit to the tag RAM 210 occurs, the way information is provided on a bus 215 to the multiplexer 220, and subsequently multiplexed onto the multiplexed the address bus 225. As an example, the address may be a 32-bit address, two memory arrays may be used, each data bus width may be 32 bits, the memory devices may be 128 megabit devices, and the division of the address space shown in Table 1 may be used.

TABLE 1

Example Address Breakdown for 1 Bank Memory Devices

| | 31 | 21 | 20 | 6 | 5 | 4 | 3 | 2 | 1 | 0 |
|---|---|---|---|---|---|---|---|---|---|---|
| Row | Tag Probe | | Row Address (15 bits) | | | | | | | |
| Column | Way | | | | Critical Chunk | | | | | |

In this example, fifteen row address bits [20:6] may be used to provide 32 k of rows. The column address information may be seven bits, including three way bits (corresponding to eight ways), and 4 bits to specify a most critical chunk (a portion of data to be returned by the memory device to the processor first), assuming a burst length of 16 transfers. In this embodiment, each page is 512 bytes (4 bytes/entry, 16 entries per line, 8 ways). However, more (or fewer) row bits may be used depending on the desired cache size. Similarly, more or fewer ways may be used to alter the level of associativity. Additionally, the memory device width could vary from 32 bits and more devices could be used in parallel, or more data could be serially transmitted (e.g., using more data elements per clock cycle or more clock cycles). Also, a different cache line size may be used.

In the embodiment of FIG. 2, a memory device 250 is coupled to the multiplexed address bus 225. A de-multiplexer 230 sends the row address portion to a row address latch 235 and a memory bank 255. The row lines of the memory array are activated, thereby reading out a page of memory (that portion of the memory accessed by the row address specified). The de-multiplexer 230 sends the column address portion to the column address latch 240 and onto a selector 260. A subset of the page of data from the memory bank 255 is selected by the selector 260 according to the column address information for transmission back to the processor 200 on a data bus.

Typically, the output of a memory array such as the memory bank 255 is latched. Additionally, some memory arrays also now include more elaborate structures at the output of the memory array. For example, a DRAM memory array may have a set of SRAM cells at the DRAM array output to hold the output generated by one or more page reads to the DRAM array. Thus, the selector 260 may include a latching circuit to latch data from each way, memory cells, sense amplifiers, and/or various known or otherwise available devices used in conjunction with reading specific portions of a memory array. Additionally, the selector 260 may use any known or otherwise available circuitry or logic to perform the selecting or multiplexing function according to the column address information.

In a traditional operating-system-level paging scheme in which four kilobyte pages are used, numerous translated address bits are transmitted as part of the row address to the DRAM before the tag look-up occurs. This represents yet another contrast to a traditional first level SRAM cache in which untranslated sub-page portions may be sent to the first level cache while the address translation and tag look-up are occurring. Since a DRAM cache is likely to be a higher level, cache, any address translation may have been performed before the DRAM cache begins to service the request. In other embodiments, different size memory devices and accordingly different row and column address lengths may be used. Moreover, different operating-system-level page sizes may be used (or OS-level paging may not be used at all); therefore, the row address may or may not contain translated address bits.

Figure 3A:
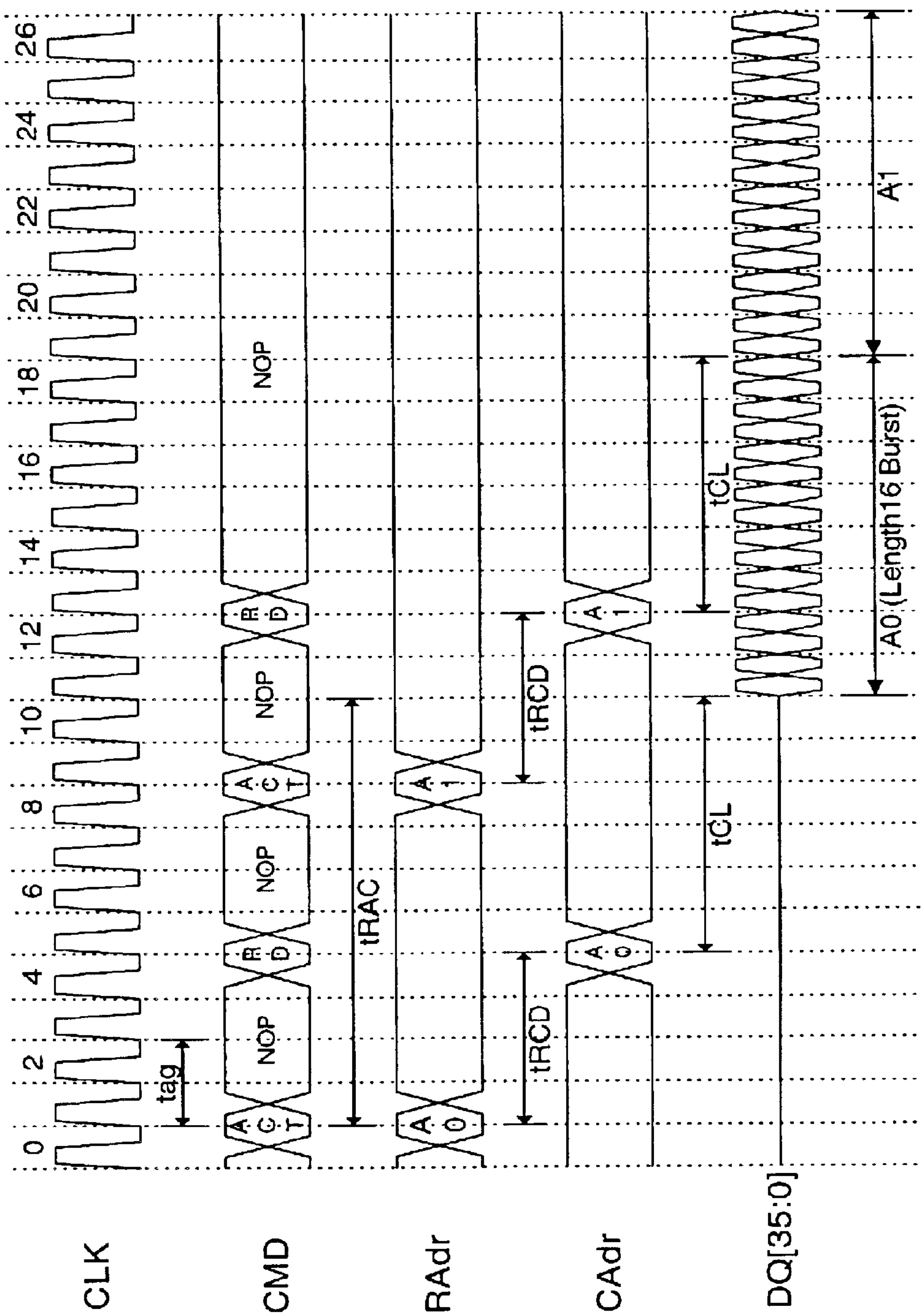
FIG. 3*a* illustrates a timing diagram for two cache reads according to one embodiment.

FIG. 3*a* illustrates a timing diagram for two cache reads according to one embodiment. In the initial (0) cycle of the command clock (CMDCLK), an activate (ACT) command is driven on a command portion of the multiplexed address and command bus, and a first row address portion of an address (A0) is driven on an address portion of the multiplexed address and command bus. In this embodiment, the tag lookup occurs in clock cycles 1 and 2. Also, in this embodiment, the row to column delay (tRCD) is four clock cycles. Thus, the column address is subsequently driven on the address portion of the multiplexed address and command bus in the fourth clock cycle, along with a read command (RD) on the command portion of the multiplexed address and command bus. In this embodiment, the delay from the row address to data being output (tRAC) is 10 clock cycles and the delay from the column address to data being output (tCL) is 6 clock cycles. Accordingly, data begins to appear on the data bus in the 11th clock cycle in response to the first cache read to memory location A0. In the illustrated embodiment, a double data rate is used, with two data entries being driven per data bus per clock.

Additionally, this embodiment allows a second memory read to a second memory location (A1) to begin prior to completion of the first memory read. Thus, a second row address and a second activate command are driven in the eighth clock cycle, and a second column address and read command are driven in the 12th clock cycle. As a result, sixteen double-word (32 bits data, 4 bits of error correction code (ECC), parity, or other data integrity bits) burst cycles returning data in response to the first read request to A0 may be immediately followed by sixteen double-word burst cycles from the second read request to A1. In one embodiment, each clock cycle may be one nanosecond, but undoubtedly other (longer or shorter) clock periods may be useful, particularly as memory and signaling technologies advance.

Figure 3B:
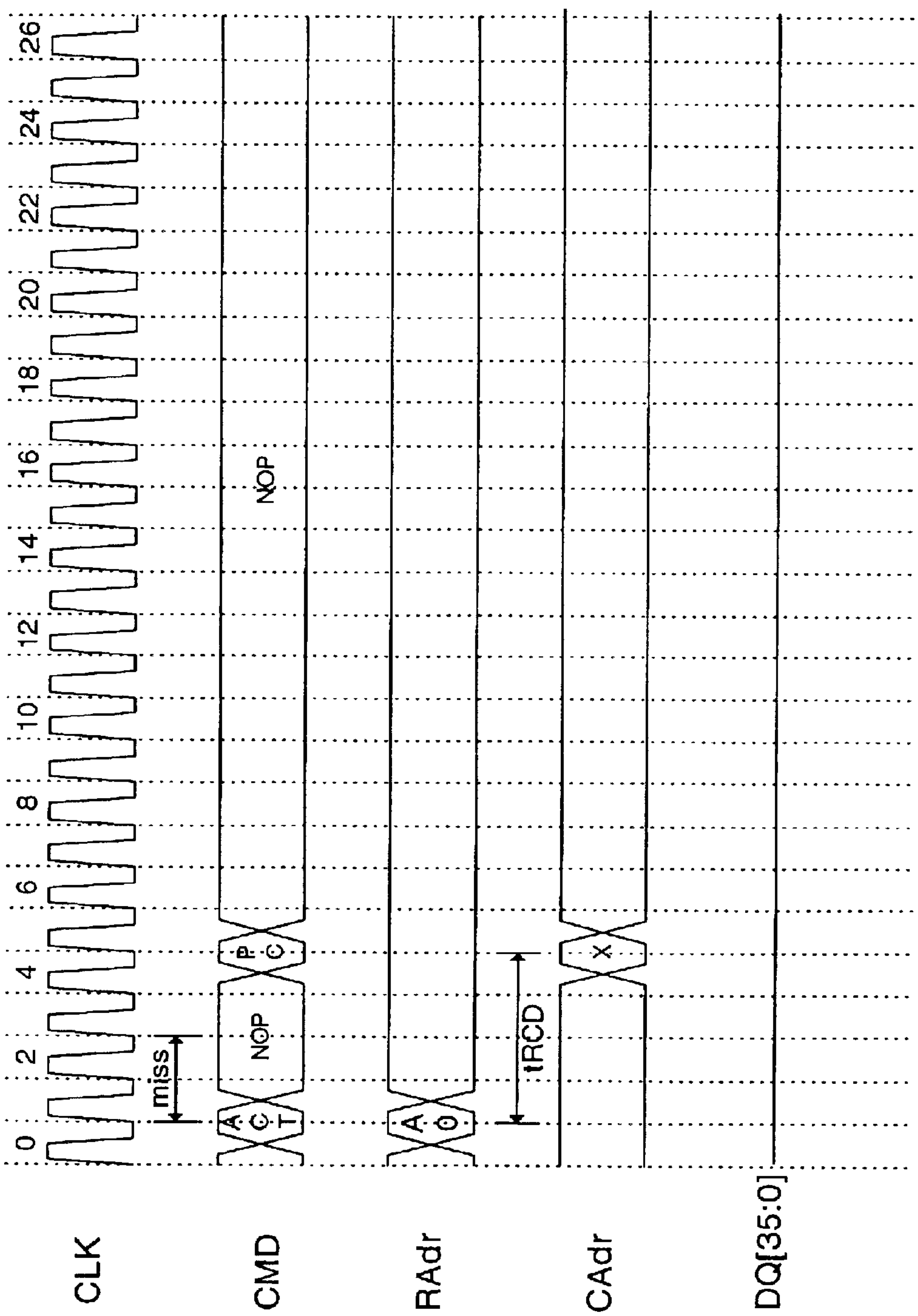
FIG. 3*b* illustrates a timing diagram for a cache miss according to one embodiment.

FIG. 3*b* illustrates a timing diagram for a cache miss according to one embodiment. The timing diagram of FIG. 3*b* is roughly the same as the timing diagram for the first memory access in FIG. 3*a*, except that the access is aborted instead of completed because the tag lookup indicated that the data was not present in the memory array. Instead of providing "A0" data as the column address in clock cycle 4, an X ("don't care" value)is provided, and instead of providing a read (RD) command in clock cycle 4, and explicit precharge (PC) command is generated. The explicit precharge command automatically closes the page that was opened by the row address and activate commands in the initial clock cycle. Other commands that close the open memory page may be used instead of an explicit precharge command if available. Notably, in a miss scenario, the column address may not be driven at all in some embodiments.

Figure 3C:
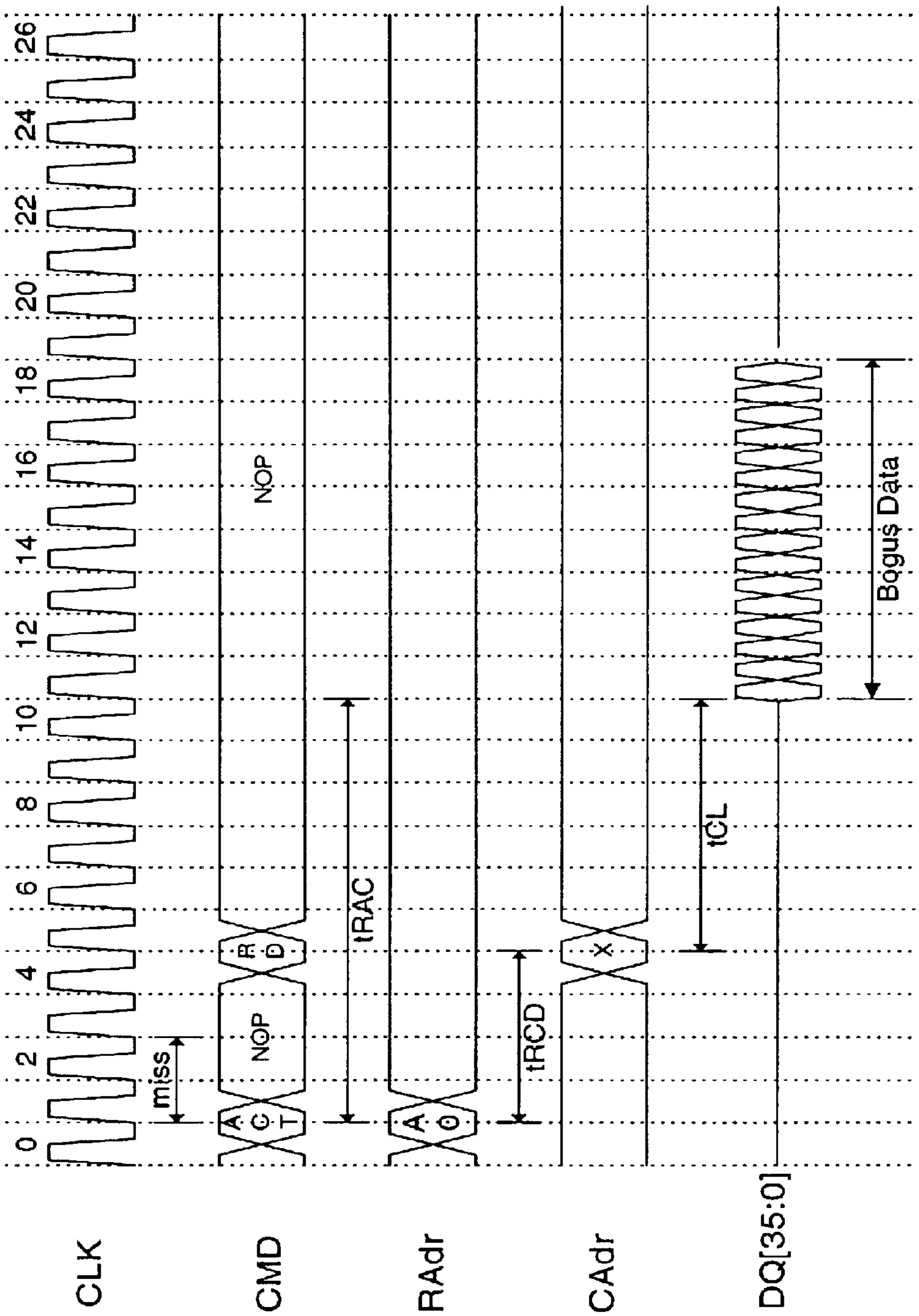
FIG. 3*c* illustrates a timing diagram for a cache miss according to another embodiment.

FIG. 3*c* illustrates a timing diagram illustrating how a cache miss situation is handled according to another embodiment. In this embodiment, the memory array may not support an explicit precharge or other page-closing commands, or it may just be more expedient or convenient to continue doing a memory access, despite the fact that the proper data is not contained in the array. In such an embodiment, a precharge may just be automatically generated prior to a next access. Thus, in the embodiment of FIG. 3*c*, a bogus way indicator (X) is provided in clock cycle 4 instead of indicating a way containing data for the address A0. Any way may be selected, but the way indicator is bogus because the way selected does not contain data requested by the original memory access request. For example, a predetermined way number may be used for all cache misses, or a random or otherwise selected way number may be used. Data is returned from the memory array to the processor starting in clock cycle 11; however, that data is discarded by the processor.

Figure 4:
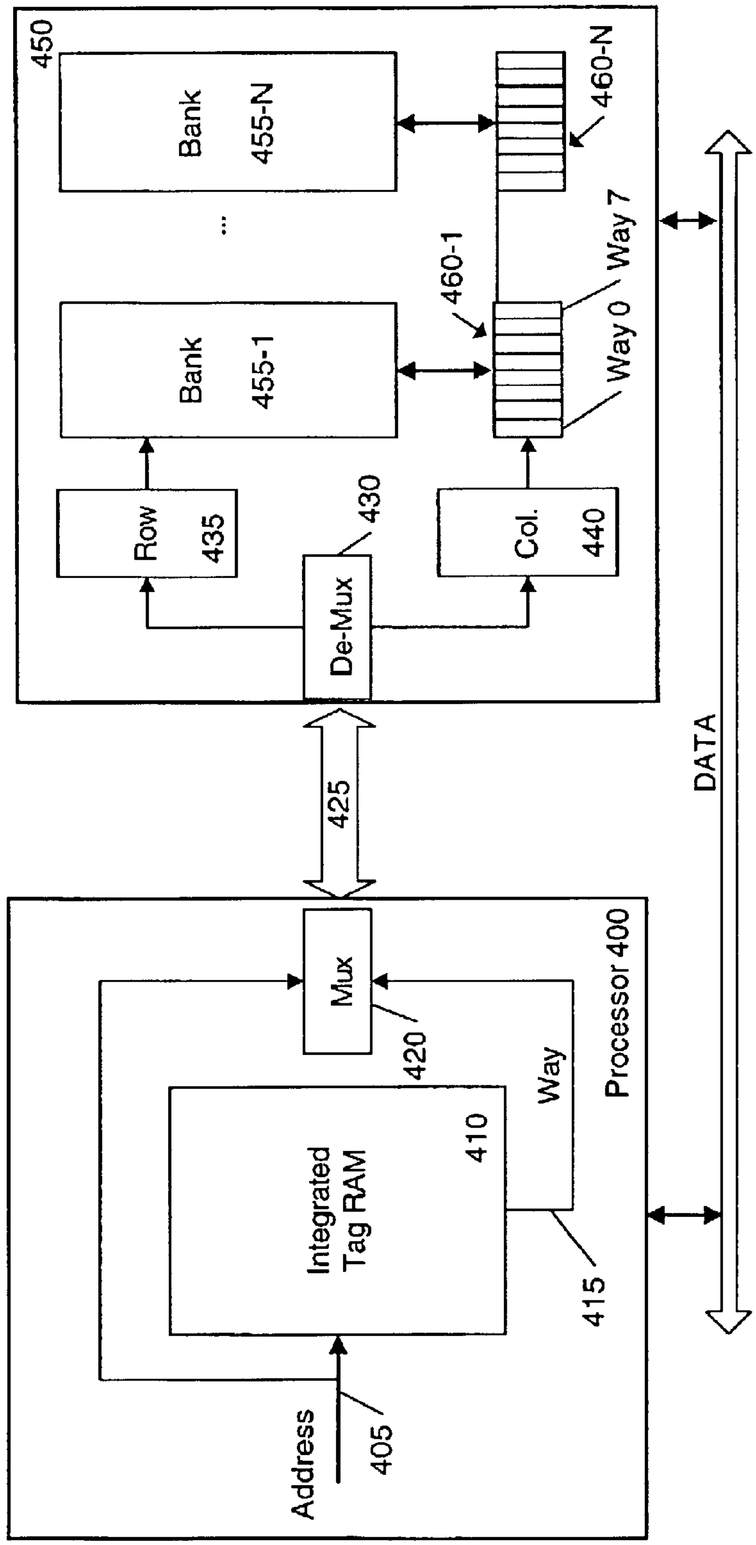
FIG. 4 illustrates one embodiment of a cache arrangement having multiple banks and multiple ways per bank.

FIG. 4 illustrates one embodiment of a cache arrangement having multiple banks and multiple ways mapped to each bank. In the embodiment of FIG. 4, a processor 400 includes an N way tag RAM 410. An address 405 is multiplexed by a multiplexer 420 onto a multiplexed address bus 425. Additionally, the address 405 is looked up in the tag RAM 410. If a hit to the tag RAM 410 occurs, the way (and possibly bank) information is provided on a bus 415 to the multiplexer 420, and subsequently multiplexed onto the multiplexed the address bus 425. As an example, the address may be a 32-bit address, two memory arrays may be used, each data bus width may be 32 bits, the memory devices may be 128 megabit devices, and the division of the address space shown in Table 2 may be used.

TABLE 2

Example Address Breakdown for 8 Bank Memory Device, Burst Length 16

| | 31 | 19 | 18 | 7 | 6 | 5 | 4 | 3 | 2 | 1 | 0 |
|---|---|---|---|---|---|---|---|---|---|---|---|
| Row | Tag Probe | | Row Address (12) | | | | | | | | |
| Column | Way (3) | Bank (3) | | | Critical Chunk | | | | | | |

In this example, twelve row address bits [18:7] may be used to provide 4 k of rows. The column address information may be ten bits, including three way bits (corresponding to eight ways), three bank bits, and four bits to specify a most critical chunk (a portion of data to be returned by the memory device to the processor first), assuming a burst length of 16 transfers. In this embodiment, each page is 512 bytes (4 bytes/entry per memory array, 16 entries per burst, 8 ways). However, more (or fewer) row bits may be used depending on the desired cache size. Similarly, more or fewer ways may be used to alter the level of associativity.

In the embodiment of FIG. 4, a memory device 450 is coupled to the multiplexed address bus 425. A de-multiplexer 430 sends the row address portion to a row address latch 435 and a set of memory banks 455-1 to 455-N. The row lines of the memory array are activated, thereby reading out a page of memory (that portion of the memory accessed by the row address specified) from each bank. Notably, in another embodiment (see, e.g., the example of Table 4 below) only one bank is enabled. The de-multiplexer 430 sends the column address portion to the column address latch 440 and onto a set of selectors 460-1 to 460-N. In this case, the column address includes both a bank number to select one of the banks (eight banks in the example of Table 2) and to select one of the ways (eight ways in the example of Table 2). Thus, a subset of the page of data from the memory bank indicated by the bank number provided in the column address is selected by the appropriate selector according to way information from the column address.

In another example, the embodiment of FIG. 4 may have a different burst length. Table 3 indicates the details for an embodiment with a burst length of eight.

TABLE 3

Example Address Breakdown for 8 Bank Memory Device, Burst Length 8

| | 31 | 19 | 18 | 6 | 5 | 4 | 3 | 2 | 1 | 0 |
|---|---|---|---|---|---|---|---|---|---|---|
| Row | Tag Probe | | Row Address (13) | | | | | | | |
| Column | Way (3) | Bank (3) | | | Critical Chunk | | | | | |

In this example, thirteen row address bits [18:6] may be used to provide 8 k of rows. The column address information may be nine bits, including three way bits (corresponding to eight ways), three bank bits, and three bits to specify the most critical chunk, assuming a burst length of 8 transfers. In this embodiment, each page is 256 bytes (4 bytes/entry per memory array, 8 entries per burst, 8 ways). Again, more (or fewer) row bits may be used depending on the desired cache size. Similarly, more or fewer ways may be used to alter the level of associativity.

As another example, it may be advantageous to avoid enabling all banks on each memory access as may be done in the examples of Tables 2 and 3. For example, a memory array may be accessed with less power consumption if fewer banks are enabled with each access. Thus, the example of Table 4 indicates an arrangement in which the row address portion is used to specify the bank number to enable. Accordingly, only the desired bank needs to be enabled to retrieve the desired data. This implementation may require extra bits to indicate the bank number in the row address. If a limited number of bits are available, such an implementation may limit the total number of rows bits that can be transmitted in the row address phase, thereby limiting the number of rows.

TABLE 4

Example Address Breakdown for 8 Bank Memory Device, Burst Length 16

| | 31 | 23 | 22 | 7 | 6 | 5 | 4 | 3 | 2 | 1 | 0 |
|---|---|---|---|---|---|---|---|---|---|---|---|
| Row | Tag Probe | | Row Address (13) and Bank # (3) | | | | | | | | |
| Column | Way (3) | | | | Critical Chunk | | | | | | |

In this example, seventeen row address and bank number bits [22:6] may be used to provide 16 k of rows (fourteen row bits) and to specify one of eight banks (3 bits). The column address information may be six bits, including three way bits (corresponding to eight ways), and three bits to specify the most critical chunk, assuming a burst length of 8 transfers. In this embodiment, each page is 256 bytes (4 bytes/entry per memory array, 8 entries per burst, 8 ways). Again, more (or fewer) row bits may be used depending on the desired cache size. Similarly, more or fewer ways may be used to alter the level of associativity.

In the examples of Tables 2–4, no direct correlation between the address bits and the bank numbers is shown because several possibilities exist. Generally speaking, access times can be decreased if consecutive memory accesses hit different banks of memory. If the same bank is hit consecutively but in a different row, then the open row is closed with a pre-charge operation or the like, which may delay the next access. Generally, a different bank may be ready for an access without needing to first do a pre-charge or similar operation. Therefore, choosing bank numbers such that in general sequential accesses hit different banks may be advantageous (see FIG. 6 and associated text).

However, in a cache memory, other bank encodings may also be useful. In a cache, data in adjacent way entries are unlikely to be from sequential memory locations because sequential cache lines typically map to a different set (i.e., a different row in the above examples). Rather, various non-adjacent addresses are typically found in the different ways of a set (i.e., in the different ways in a row in the above example). Therefore, there may be no readily apparent optimal mapping between bank numbers and address bits since a complete memory access profile for a system is rarely available. Accordingly, different bits may be used to determine the bank number, and the best combination for a particular system and a particular set of applications may be determined by analyzing memory access patterns.

Thus, a variety of bank encodings may be used. As shown in Table 5, bits from almost any portion of the address may be used as the bank number. Also, some hashing or other mathematical function may be performed on all or a subset of the bits to derive a bank number. The bank number may be a set of the most or least significant bits or some middle set of bits of the tag, row, or least significant portion of the address. Moreover, a non-contiguous set of bits (e.g., bits 24, 18 and 13) may be used in some embodiments.

TABLE 5

| Various Bank Bit Encodings | | | | | | | | | | |
|---|---|---|---|---|---|---|---|---|---|---|
| Bank Encod'g | N | | M | P | | Q | R | S | T | 0 |
| | Tag Probe | | | Row Address | | | Critical Chunk | | LSB | |
| 1 | Bank | | | | | | | | | |
| 2 | | Bank | | | | | | | | |
| 3 | | | Bank | | | | | | | |
| 4 | | | | Bank | | | | | | |
| 5 | | | | | Bank | | | | | |
| 6 | | | | | | Bank | | | | |
| 7 | | | | | | | Bank | | | |
| 8 | | | | | | | | | Bank | |
| 9 | Bank = function of any subset of address bits or of entire address | | | | | | | | | |

Figure 5:
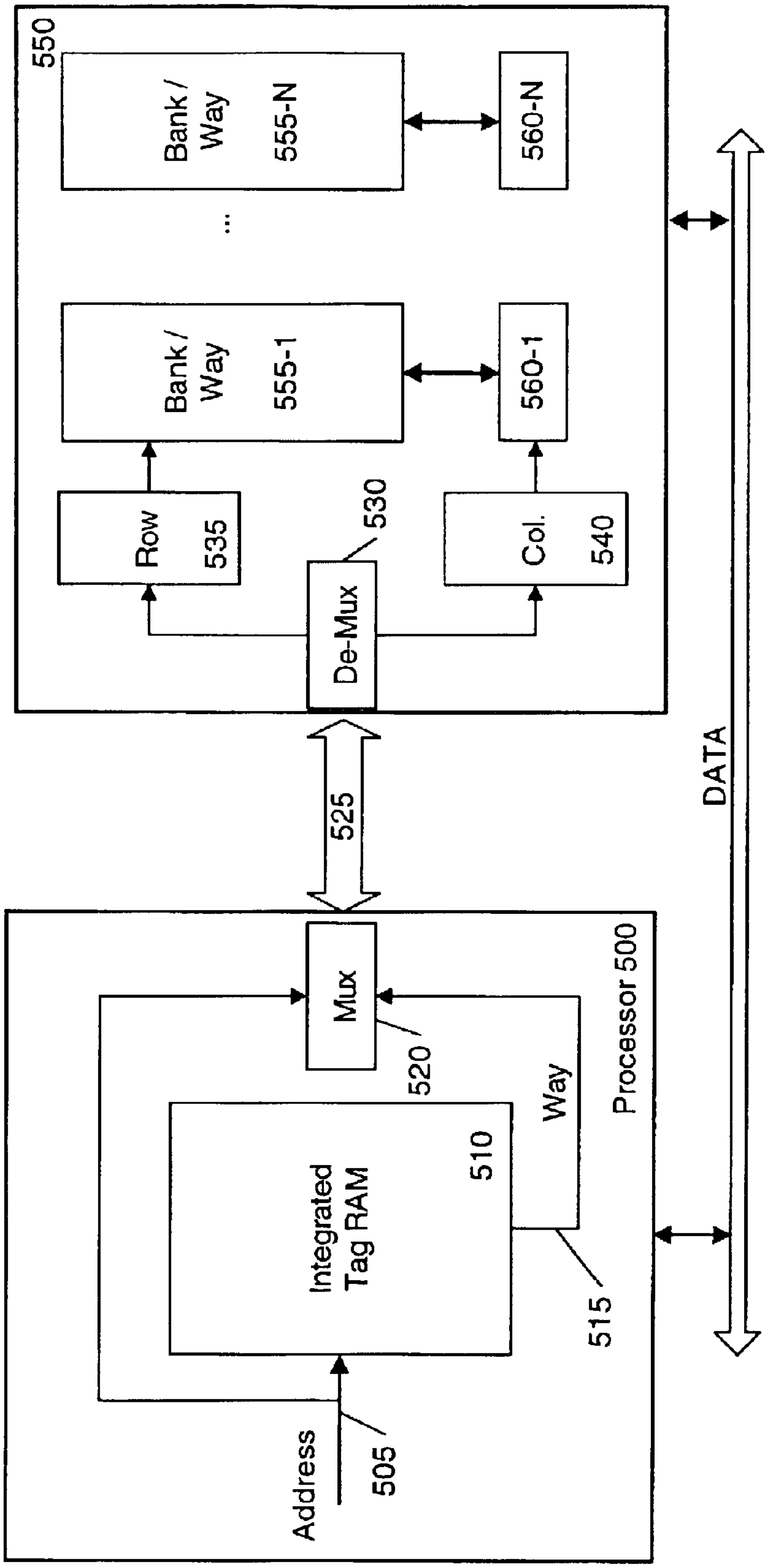
FIG. 5 illustrates one embodiment of a cache arrangement having multiple banks with each bank containing one way.

FIG. 5 illustrates one embodiment of the cache arrangement having multiple banks with each bank containing one way. In this embodiment, all banks are enabled in response to the row address, and then the appropriate bank is selected to output the data according to the column address. In the embodiment of FIG. 5, a processor 500 includes an N way tag RAM 510. An address 505 is multiplexed by a multiplexer 520 onto a multiplexed address bus 525. Additionally, the address 505 is looked up in the tag RAM 510. If a hit to the tag RAM 510 occurs, the way (and possibly bank) information is provided on a bus 515 to the multiplexer 520, and subsequently multiplexed onto the multiplexed the address bus 525. As an example, the address may be a 32-bit address, two memory arrays may be used, each data bus width may be 32 bits, the memory devices may be 128 megabit devices, and the division of the address space shown in Table 6 may be used.

TABLE 6

| Example Address Breakdown for 8 Bank Memory Device, Burst Length 16 | | | | | | | | | | | |
|---|---|---|---|---|---|---|---|---|---|---|---|
| | 31 | 22 | 21 | 7 | 6 | 5 | 4 | 3 | 2 | 1 | 0 |
| Row | Tag Probe | | Row Address (15) | | | | | | | | |
| Column | Bank = Way (3) | | | | Critical Chunk | | | | | | |

In this example, fifteen row address [21:7] may be used to provide 32 k of rows and to specify one of eight banks (3 bits). The column address information may be seven bits, including three way bits (corresponding to eight ways, and which are also bank-select bits), and four bits to specify the most critical chunk, assuming a burst length of 16 transfers. In this embodiment, each page is 64 bytes (4 bytes/entry per memory array, 16 entries per burst, 1 way). Again, more (or fewer) row bits may be used depending on the desired cache size. Similarly, more or fewer ways may be used to alter the level of associativity. Also, in some embodiments, multiple banks may be needed to store all of the data for a single way.

In the embodiment of FIG. 5, a memory device 550 is coupled to the multiplexed address bus 525. A de-multiplexer 530 sends the row address portion to a row address latch 535 and a set of memory banks 555-1 to 555-N. The row lines of the memory array are activated, thereby reading out a page of memory (that portion of the memory accessed by the row address specified) from each bank. The de-multiplexer 530 sends the column address portion to the column address latch 540 and onto a set of selectors 560-1 to 560-N. In this case, the column address includes both a bank number to select one of the banks (eight banks in the example of Table 2) and to select one of the ways (eight ways in the example of Table 2). Thus, a subset of the page of data from the memory bank indicated by the bank number provided in the column address is selected by the appropriate selector according to way information from the column address.

In some embodiments, sequential cache line access latency may be reduced by a careful mapping of cache lines to memory banks in the memory array(s). Such an approach may be advantageous, for example, in systems where sequential accesses frequently access sequential cache lines. To allow sequential accesses to hit new banks, each cache array access activates less than the entire set of cache banks. If a new access hits a bank not opened by the current access, then sequential accesses may be performed to different banks to eliminate the latency of closing a page and opening a new page in the same bank. One such embodiment is illustrated in FIG. 6.

Figure 6:
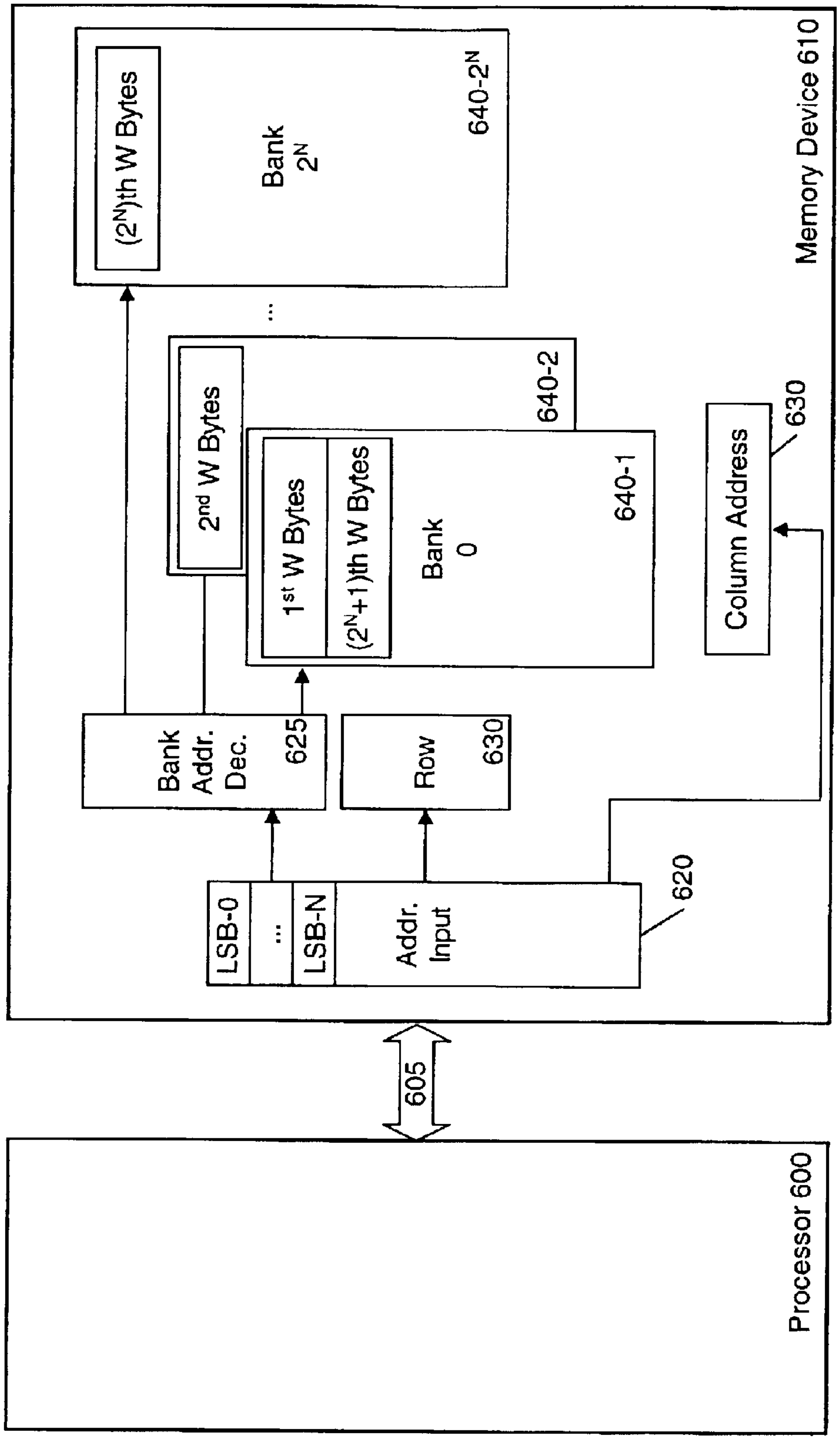
FIG. 6 illustrates one embodiment of a cache arrangement that maps sequential cache lines to different banks.

In the embodiment of FIG. 6, a processor 600 is coupled to a memory device 610 by a bus 605. The bus 605 may be a full address bus in which a full address is transmitted in a single cycle or transmission after the tag lookup has been performed in some embodiments. In other embodiments, the bus 605 may be a multiplexed address bus as previously discussed. Data and commands may be communicated between the memory device 610 as previously discussed or according to other known or otherwise available techniques.

The memory device 610 includes an address latch 620 to receive an address from the processor 620. The least significant N bits (bits 0 to N-1) of the address are decoded by a bank decoder 625 to form a bank address to address one of $2^N$ banks, banks 640-1 to 640-2$^N$. A portion of the address from the address latch 620 is stored in a row address latch 630 as the row address, and a remaining portion is stored in a column address latch 630. Various circuit elements including and/or other than latches may be used, but the address is divided into a row portion, a column portion, and a bank portion. As sequential addresses are provided to the memory device 610, different banks are accessed because the bank mapping bits (in this example, the least significant bits) change. Depending on the number of memory banks in the memory device, different numbers of least significant bits are used to provide the bank decoding. Additionally, depending on the mapping of the cache entries into the memory device 610, a different subset of bits may be used in some embodiments.

In the illustrated embodiment, the first bank 640-1 contains the first W bytes of data (W being the width of a cache line), the second bank 640-2 contains the second W bytes of data (i.e., the second cache line), and so on, with bank 640-2$^N$ containing the ($2^N$)th cache line. Thereafter, sequencing in the illustrated embodiment returns to bank 640-1 which contains the ($2^N$+1)th W bytes. In some cases, multiple memory devices or memory arrays may be supply portions of the cache line, thus the number of bytes W may be less than a full cache line. Additionally, the bank mappings need not be sequential so long as different banks are hit for sequential cache lines.

In one embodiment, the processor 600 may be configured with as little as the number of banks in the memory device 610, yet may interface with a variety of different types of memory devices. Such configuration may be performed by various conventional system or device configuration techniques. The memory device 610 may have a first latency for sequential data from the same bank, as transmitted when multiple chunks of a line are burst from one bank on a bus having a bus width less than the cache line length. The memory device 610 may have a second latency (e.g., a lower latency) when switching from an already open bank to a new bank. If the processor 600 is aware of the number of banks, it can compute when bank switches will occur, allowing the processor to know what data return latency to expect, and leaving the bank mapping to the memory device itself. In some embodiments, zero wait state back-to-back sequential cache line reads may be performed, avoiding significant delays that might otherwise occur if different rows in a single bank were accessed sequentially.

In one embodiment, multiple ways are mapped to each bank (see, e.g., FIG. 4). Each sequential cache line hits a different bank, and the data for the cache line may be contained in any of the ways that are in that bank and still be provided by the bank. Therefore, accessing the same bank twice may be advantageously avoided for sequential cache line accesses. In other embodiments, different configurations may be used, as will be appreciated by one of skill in the art.

Thus, a wide variety of examples have been given, and a large number of additional variations of cache way and set mapping to a row-and-column-addressed memory array are possible according to the principles described. Larger addresses may be used as systems expand to larger addressing spaces. Using larger memory arrays for the cache memory allows more rows (i.e., cache sets) and/or more ways to be provided, and enlarging cache sizes generally translates to better performance.

A typical hardware design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. In a software design, the design typically remains on a machine readable medium. An optical or electrical wave modulated or otherwise generated to transmit such information, a memory, or a magnetic or optical storage such as a disc may be the machine readable medium. Any of these mediums may "carry" the design information.

Thus, techniques to map cache data to memory arrays are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:

a processor portion;

a cache controller coupled to the processor portion, said cache controller to map each of a plurality of cache ways to each bank of a plurality of banks of a memory array;

a second memory array, a first data bus coupling the memory array to the processor portion and a second data bus coupling the second memory array to the processor portion, wherein an address is to be provided in a first address portion and a second address portion that are to be sequentially transmitted in a multiplexed bus to the memory array and the second memory array, and wherein said memory array and said second memory array are to together return a cache line of data by each selecting a way based on the second address portion transmitted on said multiplexed bus.

2. The apparatus of claim 1 wherein in response to a read, the cache controller enables a single bank and selects a way from the single bank.

3. The apparatus of claim 1 further comprising the memory array and the multiplexed bus coupling the memory array to the cache controller, wherein the memory array comprises a plurality of single transistor memory cells.

4. The apparatus of claim 1 wherein said cache controller is further to map sequential cache lines to different memory banks.

5. An apparatus comprising:

a processor portion;

a cache controller coupled to the processor portion and configured to map each bank of a memory array to one cache way;

a second memory array, a first data bus coupling the memory array to the processor portion and a second data bus coupling the second memory array to the processor portion, wherein an address is to be provided in a first address portion and a second address portion that are to be sequentially transmitted on a multiplexed bus to the memory array and the second memory array, and wherein said memory array and said second memory array are to together return a cache line of data by each selecting a way based on the second address portion transmitted on said multiplexed bus.

6. The apparatus of claim 5 wherein in response to a read, the cache controller enables a plurality of banks and selects a bank corresponding to a way that generates a cache hit.

7. The apparatus of claim 5 wherein said cache controller is to generate a first address portion on a multiplexed bus prior to completion of a tag lookup and is to generate a second address portion to include a way indicator determined by said tag lookup.

8. The apparatus of claim 5 wherein said memory array comprises a plurality of dynamic random access memory cells.

9. A method comprising:

performing a tag lookup to determine if an address is cached in a multi-way associative cache memory;

selecting one of a plurality of memory banks based on which way provides a hit, wherein an address is to be provided in a first address portion and a second address portion that are to be sequentially transmitted on a multiplexed bus to first of said memory banks and a second of said memory banks, and wherein said first of said memory banks and said second of said memory banks are to together return a cache line of data by each selecting a way based on the second address portion transmitted on said multiplexed bus.

10. The method or claim 9 further comprising:

enabling only one bank per memory array per access.

11. The method of claim 9 wherein a transmission of said first address portion is initiated prior to completion of said tag lookup.

12. A method comprising:

performing a tag lookup to determine if an address is cached in an N-way associative cache memory;

selecting one of N ways from a bank based on the tag lookup, wherein an address is to be provided in a first address portion a second address portion that are to be sequentially transmitted on a multiplexed bus to the bank and a second bank, and wherein said bank and said second bank are to together return a cache line of data by each selecting a way based on the second address portion transmitted on said multiplexed bus.

13. The method of claim 12 wherein selecting one of N ways comprises:

enabling only one bank wherein said one bank includes data for all ways.

14. The method of claim 12 wherein the row address is provided prior to completion of the tag lookup.

15. An apparatus comprising:

a processor portion;

a cache controller to generate an address in response to a request from the processor portion, said cache controller to map sequential cache fines to different memory banks wherein an address is to be provided in a first address portion and a second address portion that are to be sequentially transmitted on a multiplexed bus to a first multi-bank memory and a second multi-bank memory, and wherein said first and second multi-bank memories are to together return a cache line of data by each selecting a way based on the second address portion transmitted on said multiplexed bus.

16. The apparatus of claim 15 wherein a continuous burst of multiple cache lines is maintained so long as the cache controller requests sequential cache lines.

17. The apparatus of claim 16 wherein said cache controller is to simultaneously access multiple devices to assemble a line.

18. The apparatus of claim 15 wherein said first multi-bank memory uses a plurality of least significant bits of the address as a bank address.

19. The apparatus of claim 15 wherein a plurality of ways are mapped to each bank.

20. A system comprising:

a main memory;

a memory controller coupled to the main memory;

a processor coupled to the memory controller, the processor comprising:

a first level cache;

an N-way associative cache comprising:

a cache controller, said cache controller to map cache ways to particular memory banks;

a plurality of multi-bank memory arrays simultaneously accessible by the cache controller to assemble a cache line, wherein an address is to be provided in a first address portion and a second address portion that are to be sequentially transmitted on a multiplexed bus to a first of said multi-bank memory arrays and a second of said multi-bank memory arrays, and wherein said first of said multi-bank memory arrays and said second of said multi-bank memory arrays are to together return a cache line of data by each selecting a way based on the second address portion transmitted on said multiplexed bus.

21. The system of claim 20 wherein said cache controller is to map each cache way to a dedicated bank in each multi-bank memory array.

22. The system of claim 20 wherein said cache controller is to map each cache way to each bank of each multi-bank memory array.

23. The system of claim 20 wherein the first address portion is to be transmitted prior to completion of a tag lookup.

24. The system of claim 20 wherein said cache controller is to map sequential cache lines to different banks.

* * * * *